(12) United States Patent
Williams et al.

(10) Patent No.: US 8,437,465 B1
(45) Date of Patent: *May 7, 2013

(54) SYSTEMS AND METHODS FOR CAPTURING COMMUNICATIONS DATA

(75) Inventors: Jamie Richard Williams, Fleet (GB); Kenneth Richard Brodhagen, Roswell, GA (US)

(73) Assignee: Verint Americas, Inc., Alpharetta, GA (US)

( * ) Notice: Subject to any disclaimer, the term of this patent is extended or adjusted under 35 U.S.C. 154(b) by 1571 days.

This patent is subject to a terminal disclaimer.

(21) Appl. No.: 11/693,814

(22) Filed: Mar. 30, 2007

(51) Int. Cl.
*H04M 3/00* (2006.01)
*H04M 5/00* (2006.01)

(52) U.S. Cl.
USPC ............ 379/266.1; 379/265.06; 379/112.01; 379/67.1; 370/352; 370/219; 370/412

(58) Field of Classification Search ............... 379/266.1, 379/41, 51, 85, 373.04, 112.01, 133
See application file for complete search history.

(56) References Cited

U.S. PATENT DOCUMENTS

| | | | |
|---|---|---|---|
| 3,594,919 A | 7/1971 | De Bell et al. | |
| 3,705,271 A | 12/1972 | De Bell et al. | |
| 4,510,351 A | 4/1985 | Costello et al. | |
| 4,684,349 A | 8/1987 | Ferguson et al. | |
| 4,694,483 A | 9/1987 | Cheung | |
| 4,763,353 A | 8/1988 | Canale et al. | |
| 4,815,120 A | 3/1989 | Kosich | |
| 4,924,488 A | 5/1990 | Kosich | |
| 4,953,159 A | 8/1990 | Hayden et al. | |
| 5,016,272 A | 5/1991 | Stubbs et al. | |
| 5,101,402 A | 3/1992 | Chiu et al. | |
| 5,117,225 A | 5/1992 | Wang | |
| 5,210,789 A | 5/1993 | Jeffus et al. | |
| 5,239,460 A | 8/1993 | LaRoche | |
| 5,241,625 A | 8/1993 | Epard et al. | |
| 5,267,865 A | 12/1993 | Lee et al. | |
| 5,299,260 A | 3/1994 | Shaio | |

(Continued)

FOREIGN PATENT DOCUMENTS

EP 0453128 A2 10/1991
EP 0773687 A2 5/1997

(Continued)

OTHER PUBLICATIONS

"Customer Spotlight: Navistar International," Web page, unverified print date of Apr. 1, 2002.

(Continued)

*Primary Examiner* — Joseph J Nguyen
(74) *Attorney, Agent, or Firm* — Meunier Carlin & Curfman

(57) ABSTRACT

Systems and methods for capturing communications data are provided. An exemplary method comprises the steps of: establishing connection with a customer center, the customer center being associated with a communications infrastructure; obtaining information that is related to the communications infrastructure, the information obtained being related to a communications protocol that is associated with the communications infrastructure; determining the type of communications protocol based on the information obtained; determining whether the type of communications protocol is supported by a recording system; responsive to determining that the type of communications protocol is supported, receiving communications data using the determined communications protocol; determining whether to record the received communications data; and responsive to determining that the received communications data are to be recorded, recording the received communications data.

25 Claims, 11 Drawing Sheets

U.S. PATENT DOCUMENTS

| | | |
|---|---|---|
| 5,311,422 A | 5/1994 | Loftin et al. |
| 5,315,711 A | 5/1994 | Barone et al. |
| 5,317,628 A | 5/1994 | Misholi et al. |
| 5,347,306 A | 9/1994 | Nitta |
| 5,388,252 A | 2/1995 | Dreste et al. |
| 5,396,371 A | 3/1995 | Henits et al. |
| 5,432,715 A | 7/1995 | Shigematsu et al. |
| 5,465,286 A | 11/1995 | Clare et al. |
| 5,475,625 A | 12/1995 | Glaschick |
| 5,485,569 A | 1/1996 | Goldman et al. |
| 5,491,780 A | 2/1996 | Fyles et al. |
| 5,499,291 A | 3/1996 | Kepley |
| 5,535,256 A | 7/1996 | Maloney et al. |
| 5,572,652 A | 11/1996 | Robusto et al. |
| 5,577,112 A | 11/1996 | Cambray et al. |
| 5,590,171 A | 12/1996 | Howe et al. |
| 5,597,312 A | 1/1997 | Bloom et al. |
| 5,619,183 A | 4/1997 | Ziegra et al. |
| 5,696,906 A | 12/1997 | Peters et al. |
| 5,717,879 A | 2/1998 | Moran et al. |
| 5,721,842 A | 2/1998 | Beasley et al. |
| 5,742,670 A | 4/1998 | Bennett |
| 5,748,499 A | 5/1998 | Trueblood |
| 5,778,182 A | 7/1998 | Cathey et al. |
| 5,784,452 A | 7/1998 | Carney |
| 5,790,798 A | 8/1998 | Beckett, II et al. |
| 5,796,952 A | 8/1998 | Davis et al. |
| 5,809,247 A | 9/1998 | Richardson et al. |
| 5,809,250 A | 9/1998 | Kisor |
| 5,825,869 A | 10/1998 | Brooks et al. |
| 5,835,572 A | 11/1998 | Richardson, Jr. et al. |
| 5,862,330 A | 1/1999 | Anupam et al. |
| 5,864,772 A | 1/1999 | Alvarado et al. |
| 5,884,032 A | 3/1999 | Bateman et al. |
| 5,907,680 A | 5/1999 | Nielsen |
| 5,918,214 A | 6/1999 | Perkowski |
| 5,923,746 A | 7/1999 | Baker et al. |
| 5,933,811 A | 8/1999 | Angles et al. |
| 5,944,791 A | 8/1999 | Scherpbier |
| 5,946,375 A * | 8/1999 | Pattison et al. .......... 379/112.01 |
| 5,948,061 A | 9/1999 | Merriman et al. |
| 5,958,016 A | 9/1999 | Chang et al. |
| 5,964,836 A | 10/1999 | Rowe et al. |
| 5,978,648 A | 11/1999 | George et al. |
| 5,982,857 A | 11/1999 | Brady |
| 5,987,466 A | 11/1999 | Greer et al. |
| 5,990,852 A | 11/1999 | Szamrej |
| 5,991,373 A | 11/1999 | Pattison et al. |
| 5,991,796 A | 11/1999 | Anupam et al. |
| 6,005,932 A | 12/1999 | Bloom |
| 6,009,429 A | 12/1999 | Greer et al. |
| 6,014,134 A | 1/2000 | Bell et al. |
| 6,014,647 A | 1/2000 | Nizzari et al. |
| 6,018,619 A | 1/2000 | Allard et al. |
| 6,035,332 A | 3/2000 | Ingrassia et al. |
| 6,038,544 A | 3/2000 | Machin et al. |
| 6,039,575 A | 3/2000 | L'Allier et al. |
| 6,057,841 A | 5/2000 | Thurlow et al. |
| 6,058,163 A | 5/2000 | Pattison et al. |
| 6,061,798 A | 5/2000 | Coley et al. |
| 6,072,860 A | 6/2000 | Kek et al. |
| 6,076,099 A | 6/2000 | Chen et al. |
| 6,078,894 A | 6/2000 | Clawson et al. |
| 6,091,712 A | 7/2000 | Pope et al. |
| 6,108,711 A | 8/2000 | Beck et al. |
| 6,122,665 A | 9/2000 | Bar et al. |
| 6,122,668 A | 9/2000 | Teng et al. |
| 6,130,668 A | 10/2000 | Stein |
| 6,138,139 A | 10/2000 | Beck et al. |
| 6,144,991 A | 11/2000 | England |
| 6,146,148 A | 11/2000 | Stuppy |
| 6,151,622 A | 11/2000 | Fraenkel et al. |
| 6,154,771 A | 11/2000 | Rangan et al. |
| 6,157,808 A | 12/2000 | Hollingsworth |
| 6,171,109 B1 | 1/2001 | Ohsuga |
| 6,182,094 B1 | 1/2001 | Humpleman et al. |
| 6,195,679 B1 | 2/2001 | Bauersfeld et al. |
| 6,201,948 B1 | 3/2001 | Cook et al. |
| 6,211,451 B1 | 4/2001 | Tohgi et al. |
| 6,225,993 B1 | 5/2001 | Lindblad et al. |
| 6,230,197 B1 | 5/2001 | Beck et al. |
| 6,236,977 B1 | 5/2001 | Verba et al. |
| 6,244,758 B1 | 6/2001 | Solymar et al. |
| 6,282,548 B1 | 8/2001 | Burner et al. |
| 6,286,030 B1 | 9/2001 | Wenig et al. |
| 6,286,046 B1 | 9/2001 | Bryant |
| 6,288,753 B1 | 9/2001 | DeNicola et al. |
| 6,289,340 B1 | 9/2001 | Puram et al. |
| 6,301,462 B1 | 10/2001 | Freeman et al. |
| 6,301,573 B1 | 10/2001 | McIlwaine et al. |
| 6,324,282 B1 | 11/2001 | McIlwaine et al. |
| 6,347,374 B1 | 2/2002 | Drake et al. |
| 6,351,467 B1 | 2/2002 | Dillon |
| 6,353,851 B1 | 3/2002 | Anupam et al. |
| 6,360,250 B1 | 3/2002 | Anupam et al. |
| 6,370,574 B1 | 4/2002 | House et al. |
| 6,404,857 B1 | 6/2002 | Blair et al. |
| 6,411,989 B1 | 6/2002 | Anupam et al. |
| 6,418,471 B1 | 7/2002 | Shelton et al. |
| 6,459,787 B2 | 10/2002 | McIlwaine et al. |
| 6,487,195 B1 | 11/2002 | Choung et al. |
| 6,493,758 B1 | 12/2002 | McLain |
| 6,502,131 B1 | 12/2002 | Vaid et al. |
| 6,510,220 B1 | 1/2003 | Beckett, II et al. |
| 6,535,909 B1 | 3/2003 | Rust |
| 6,542,602 B1 | 4/2003 | Elazer |
| 6,546,405 B2 | 4/2003 | Gupta et al. |
| 6,560,328 B1 | 5/2003 | Bondarenko et al. |
| 6,583,806 B2 | 6/2003 | Ludwig et al. |
| 6,606,657 B1 | 8/2003 | Zilberstein et al. |
| 6,651,042 B1 * | 11/2003 | Field et al. .................... 704/270 |
| 6,665,644 B1 | 12/2003 | Kanevsky et al. |
| 6,674,447 B1 | 1/2004 | Chiang et al. |
| 6,683,633 B2 | 1/2004 | Holtzblatt et al. |
| 6,697,858 B1 | 2/2004 | Ezerzer et al. |
| 6,724,887 B1 | 4/2004 | Eilbacher et al. |
| 6,738,456 B2 | 5/2004 | Wrona et al. |
| 6,757,361 B2 | 6/2004 | Blair et al. |
| 6,772,396 B1 | 8/2004 | Cronin et al. |
| 6,775,377 B2 | 8/2004 | McIlwaine et al. |
| 6,792,575 B1 | 9/2004 | Samaniego et al. |
| 6,810,414 B1 | 10/2004 | Brittain |
| 6,820,083 B1 | 11/2004 | Nagy et al. |
| 6,823,384 B1 | 11/2004 | Wilson et al. |
| 6,870,916 B2 | 3/2005 | Henrikson et al. |
| 6,901,438 B1 | 5/2005 | Davis et al. |
| 6,959,078 B1 | 10/2005 | Eilbacher et al. |
| 6,965,886 B2 | 11/2005 | Govrin et al. |
| 7,274,685 B1 * | 9/2007 | Peters .......................... 370/352 |
| 7,570,755 B2 * | 8/2009 | Williams et al. .......... 379/266.1 |
| 7,822,018 B2 * | 10/2010 | Williams et al. ............. 370/352 |
| 2001/0000962 A1 | 5/2001 | Rajan |
| 2001/0032335 A1 | 10/2001 | Jones |
| 2001/0043697 A1 | 11/2001 | Cox et al. |
| 2002/0038363 A1 | 3/2002 | MacLean |
| 2002/0052948 A1 | 5/2002 | Baudu et al. |
| 2002/0065911 A1 | 5/2002 | Von Klopp et al. |
| 2002/0065912 A1 | 5/2002 | Catchpole et al. |
| 2002/0128925 A1 | 9/2002 | Angeles |
| 2002/0143925 A1 | 10/2002 | Pricer et al. |
| 2002/0165954 A1 | 11/2002 | Eshghi et al. |
| 2003/0007613 A1 * | 1/2003 | Macklin ....................... 379/88.19 |
| 2003/0055883 A1 | 3/2003 | Wiles et al. |
| 2003/0079020 A1 | 4/2003 | Gourraud et al. |
| 2003/0144900 A1 | 7/2003 | Whitmer |
| 2003/0154240 A1 | 8/2003 | Nygren et al. |
| 2004/0100507 A1 | 5/2004 | Hayner et al. |
| 2004/0165717 A1 | 8/2004 | McIlwaine et al. |
| 2005/0031101 A1 * | 2/2005 | Renton et al. .................. 379/111 |
| 2005/0138560 A1 | 6/2005 | Lee et al. |
| 2006/0067303 A1 * | 3/2006 | Murakami et al. ............ 370/352 |
| 2008/0080482 A1 * | 4/2008 | Calahan et al. ............... 370/352 |
| 2008/0080685 A1 * | 4/2008 | Barnes et al. ............. 379/112.05 |
| 2008/0137814 A1 * | 6/2008 | Williams et al. ............. 379/67.1 |

FOREIGN PATENT DOCUMENTS

| EP | 0989720 | 3/2000 |
|---|---|---|
| GB | 2369263 | 5/2002 |
| WO | WO 98/43380 | 11/1998 |
| WO | WO 00/16207 | 3/2000 |

OTHER PUBLICATIONS

"DKSystems Integrates QM Perception with OnTrack for Training," Web page, unverified print date of Apr. 1, 2002, unverified cover date of Jun. 15, 1999.
"OnTrack Online" Delivers New Web Functionality, Web page, unverified print date of Apr. 2, 2002, unverified cover date of Oct. 5, 1999.
"Price WaterouseCoopers Case Study" The Business Challenge, Web page, unverified cover date of 2000.
Abstract, net.working: "An Online Webliography," *Technical Training* pp. 4-5 (Nov.-Dec. 1998).
Adams et al., "Our Turn-of-the-Century Trend Watch" *Technical Training* pp. 46-47 (Nov./Dec. 1998).
Barron, "The Road to Performance: Three Vignettes," *Technical Skills and Training* pp. 12-14 (Jan. 1997).
Bauer, "Technology Tools: Just-in-Time Desktop Training is Quick, Easy, and Affordable," *Technical Training* pp. 8-11 (May/Jun. 1998).
Beck et al., "Applications of A1 in Education," *AMC Crossroads* vol. 1: 1-13 (Fall 1996) Web page, unverified print date of Apr. 12, 2002.
Benson and Cheney, "Best Practices in Training Delivery," *Technical Training* pp. 14-17 (Oct. 1996).
Bental and Cawsey, "Personalized and Adaptive Systems for Medical Consumer Applications," Communications ACM 45(5): 62-63 (May 2002).
Blumenthal et al., "Reducing Development Costs with Intelligent Tutoring System Shells," pp. 1-5, Web page, unverified print date of Apr. 9, 2002, unverified cover date of Jun. 10, 1996.
Brusilosy et al., "Distributed intelligent tutoring on the Web," Proceedings of the $8^{th}$ World Conference of the AIED Society, Kobe, Japan, Aug. 18-22, pp. 1-9 Web page, unverified print date of Apr. 12, 2002, unverified cover date of Aug. 18-22, 1997.
Brusilovsky and Pesin, ISIS-Tutor: An Intelligent Learning Environment for CD/ISIS Users, pp. 1-15 Web page, unverified print date of May 2, 2002.
Brusilovsky, "Adaptive Educational Systems on the World-Wide-Web: A Review of Available Technologies," pp. 1-10, Web Page, unverified print date of Apr. 12, 2002.
Byrnes et al., "The Development of a Multiple-Choice and True-False Testing Environment on the Web," pp. 1-8, Web page, unverified print date of Apr. 12, 2002, unverified cover date of 1995.
Calvi and DeBra, "Improving the Usability of Hypertext Courseware through Adaptive Linking," *ACM*, unknown page numbers (1997).
Coffey, "Are Performance Objectives Really Necessary?" *Technical Skills and Training* pp. 25-27 (Oct. 1995).
Cohen, "Knowledge Management's Killer App," pp. 1-11, Web page, unverified print date of Sep. 12, 2002, unverified cover date of 2001.
Cole-Gomolski, "New Ways to manage E-Classes," *Computerworld* 32(48):4344 (Nov. 30, 1998).
Cross: "Sun Microsystems—the SunTAN Story," Internet Time Group 8 (© 2001).
De Bra et al., "Adaptive Hypermedia: From Systems to Framework," *ACM* (2000).
De Bra, "Adaptive Educational Hypermedia on the Web," *Communications ACM* 45(5):60-61 (May 2002).
Dennis and Gruner, "Computer Managed Instruction at Arthur Andersen & Company: A Status Report," *Educational Technical* pp. 7-16 (Mar. 1992).
Diessel et al., "Individualized Course Generation: A Marriage Between CAL and ICAL," *Computers Educational* 22(1/2) 57-65 (1994).
Dyreson, "An Experiment in Class Management Using the World Wide Web," pp. 1-12, Web page, unverified print date of Apr. 12, 2002.
E Learning Community, "Excellence in Practice Award: Electronic Learning Technologies," *Personal Learning Network* pp. 1-11, Web page, unverified print date of Apr. 12, 2002.

Eklund and Brusilovsky, "The Value of Adaptivity in Hypermedia Learning Environments: A Short Review of Empirical Evidence," pp. 1-8, Web page, unverified print date of May 2, 2002.
*e-Learning the future of learning* THINQ Limited, London, Version 1.0 (2000).
Eline, "A Trainer's Guide to Skill Building," *Technical Training* pp. 34-41 (Sep./Oct. 1998).
Eline, "Case Study: Briding the Gap in Canada's IT Skills," *Technical Skills and Training* pp. 23-25 (Jul. 1997).
Eline "Case Study: IBT's Place in the Sun," *Technical Training* pp. 12-17 (Aug./Sep. 1997).
Fritz, "CB templates for productivity: Authoring system templates for trainers," *Emedia Professional* 10(8):6678 (Aug. 1997).
Fritz, "ToolBook II: Asymetrix's updated authoring software tackles the Web," *Emedia Professional* 10(20): 102106 (Feb. 1997).
Gibson et al., "A Comparative Analysis of Web-Based Testing and Evaluation Systems," pp. 1-8, Web page, unverified print date of Apr. 11, 2002.
Halberg and DeFiore, "Curving Toward Performance: Following a Hierarchy of Steps Toward a Performance Orientation," *Technical Skills and Training* pp. 9-11 (Jan. 1997).
Harsha, "Online Training 'Sprints' Ahead," *Technical Training* pp. 27-29 (Jan./Feb. 1999).
Heideman, "Training Technicians for a High-Tech Future: These six steps can help develop technician training for high-tech work," pp. 11-14 (Feb./Mar. 1995).
Heideman, "Writing Performance Objectives Simple as A-B-C (and D)," *Technical Skills and Training* pp. 5-7 (May/Jun. 1996).
Hollman, "Train Without Pain: The Benefits of Computer-Based Training Tools," pp. 1-11, Web page, unverified print date of Mar. 20, 2002, unverified cover date of Jan. 1, 2000.
Klein, "Command Decision Training Support Technology," Web page, unverified print date of Apr. 12, 2002.
Koonce, "Where Technology and Training Meet," *Technical Training* pp. 10-15 (Nov./Dec. 1998).
Kursh, "Going the distance with Web-based training," *Training and Development* 52(3): 5053 (Mar. 1998).
Larson, "Enhancing Performance Through Customized Online Learning Support," *Technical Skills and Training* pp. 25-27 (May/Jun. 1997).
Linton, et al. "OWL: A Recommender System for Organization-Wide Learning," *Educational Technical Society* 3(1): 62-76 (2000).
Lucadamo and Cheney, "Best Practices in Technical Training," *Technical Training* pp. 21-26 (Oct. 1997).
McNamara, "Monitoring Solutions: Quality Must be Seen and Heard," *Inbound/Outbound* pp. 66-67 (Dec. 1989).
Merrill, "The New Component Design Theory: Instruction design for courseware authoring," *Instructional Science* 16:19-34 (1987).
Minton-Eversole, "IBT Training Truths Behind the Hype," *Technical Skills and Training* pp. 15-19 (Jan. 1997).
Mizoguchi, "Intelligent Tutoring Systems: The Current State of the Art," Trans. IEICE E73(3):297-307 (Mar. 1990).
Mostow and Aist, "The Sounds of Silence: Towards Automated Evaluation of Student Leaning a Reading Tutor that Listens" *American Association for Artificial Intelligence*, Web page, unknown date Aug. 1997.
Mullier et al., "A Web base Intelligent Tutoring System," pp. 1-6, Web page, unverified print date of May 2, 2002.
Nash, Database Marketing, 1993, pp. 158-165, 172-185, McGraw Hill, Inc. USA.
Nelson et al. "The Assessment of End-User Training Needs," *Communications ACM* 38(7):27-39 (Jul. 1995).
O'Herron, "CenterForce Technologies CenterForce Analyzer," Web page unverified print dateof Mar. 2, 2002, unverified cover date of Jun. 1, 1999.
O'Roark, "Basic Skills Get a Boost," Technical Training pp. 10-13 (Jul./Aug. 1998).
Pamphlet, On Evaluating Educational Innovations, authored by Alan Lesgold, unverified cover date of Mar. 5, 1998.
Papa et al., "A Differential Diagnostic Skills Assessment and Tutorial Tool," *Computer Education* 18(1-3):45-50 (1992).
PCT International Search Report, International Application No. PCT/US03/02541, mailed May 12, 2003.

Phaup, "New Software Puts Computerized Tests on the Internet: Presence Corporation announces breakthrough Question Mark™ Web Product," Web page, unverified print date of Apr. 1, 2002.

Phaup, "QM Perception™ Links with Integrity Training's WBT Manager™ to Provide Enhanced Assessments of Web Based Courses," Web page, unverified print date of Apr. 1, 2002, unverified cover date of Mar. 25, 1999.

Phaup, "Question Mark Introduces Access Export Software," Web page, unverified print date of Apr. 2, 2002, unverified cover date of Mar. 1, 1997.

Phaup, "Question Mark Offers Instant Online Feedback for Web Quizzes and Questionnaires: Univerity of California assist with Beta Testing, Server scripts now available on high-volume users," Web page, unverified print date of Apr. 1, 2002, unverified cover date of May 6, 1996.

Piskurich, Now-You-See-'Em, Now-You-Don't Learning Centers, *Technical Training* pp. 18-21 (Jan./Feb. 1999).

Read, "Sharpening Agents' Skills," pp. 1-15, Web page, unverified print date of Mar. 20, 2002, unverified cover date of Oct. 1, 1999.

Reid, "On Target: Assessing Technical Skills," *Technical Skills and Training* pp. 6-8 (May/Jun. 1995).

Stormes, "Case Study: Restructuring Technical Training Using ISD," *Technical Skills and Training* pp. 23-26 (Feb./Mar. 1997).

Tennyson, "Artificial Intelligence Methods in Computer-Based Instructional Design," Journal of Instructional Development 7(3): 17-22 (1984).

The Editors, Call Center, "The Most Innovative Call Center Products We Saw in 1999," Web page, unverified print date of Mar. 20, 2002, unverified cover date of Feb. 1, 2000.

Tinoco et al., "Online Evaluation in WWW-based Courseware," *ACM* pp. 194-198 (1997).

Uiterwijk et al., "The virtual classroom," *InfoWorld* 20(47):6467 (Nov. 23, 1998).

Unknown Author, "Long-distance learning," *InfoWorld* 20(36):7676 (1998).

Untitled, 10th Mediterranean Electrotechnical Conference vol. 1 pp. 124-126 (2000).

Watson and Belland, "Use of Learner Data in Selecting Instructional Content for Continuing Education," *Journal of Instructional Development* 8(4):29-33 (1985).

Weinschenk, "Performance Specifications as Change Agents," *Technical Training* pp. 12-15 (Oct. 1997).

Witness Systems promotional brochure for eQuality entitled "Building Customer Loyalty Through BusinessDriven Recording of Multimedia Interactions in your Contact Center," (2000).

Aspect Call Center Product Specification, "Release 2.0", Aspect Telecommuications Corporation, May 23, 1998 798.

Metheus X Window Record and Playback, XRP Features and Benefits, 2 pages Sep. 1994 LPRs.

"Keeping an Eye on Your Agents," Call Center Magazine, pp. 32-34, Feb. 1993 LPRs & 798.

Anderson: Interactive TVs New Approach, The Standard, Oct. 1, 1999.

Ante, *Everything You Ever Wanted to Know About Cryptography Legislation . . . (But Were to Sensible to Ask)*, PC world Online, Dec. 14, 1999.

Berst, *It's Baa-aack. How Interative TV is Sneaking Into Your Living Room*, The AnchorDesk, May 10, 1999.

Berst, *Why Interactive TV Won't Turn You On (Yet)*, The AnchorDesk, Jul. 13, 1999.

Borland and Davis, *US West Plans Web Services on TV*, CNETNews.com, Nov. 22, 1999.

Brown, *Let PC Technology Be Your TV Guide*, PC Magazine, Jun. 7, 1999.

Brown, *Interactive TV: The Sequel*, NewMedia, Feb. 10, 1998.

Cline, Déjà vu—*Will Interactive TV Make It This Time Around?*, DevHead, Jul. 9, 1999.

Crouch, *TV Channels on the Web*, PC World, Sep. 15, 1999.

D'Amico, *Interactive TV Gets $99 set-top box*, IDG.net, Oct. 6, 1999.

Davis, *Satellite Systems Gear Up for Interactive TV Fight*, CNETNews.com, Sep. 30, 1999.

Diederich, *Web TV Data Gathering Raises Privacy Concerns*, ComputerWorld, Oct. 13, 1998.

*EchoStar, MediaX Mix Interactive Multimedia With Interactive Television*, PRNews Wire, Jan. 11, 1999.

Furger, *The Internet Meets the Couch Potato*, PCWorld, Oct. 1996.

*Hong Kong Comes First with Interactive TV*, SCI-TECH, Dec. 4, 1997.

Needle, *Will the Net Kill Network TV?* PC World Online, Mar. 10, 1999.

Kane, *AOL-Tivo: You've Got Interactive TV*, ZDNN, Aug. 17, 1999.

Kay, *E-Mail in Your Kitchen*, PC World Online, 093/28/96.

Kenny, *TV Meets Internet*, PC World Online, Mar. 28, 1996.

Linderholm, *Avatar Debuts Home Theater PC*, PC World Online, Dec. 1, 1999.

Rohde, *Gates Touts Interactive TV*, InfoWorld, Oct. 14, 1999.

Ross, *Broadcasters Use TV Signals to Send Data*, PC World Oct. 1996.

Stewart, *Interactive Television at Home: Television Meets the Internet*, Aug. 1998.

Wilson, *U.S. West Revisits Interactive TV*, Interactive Week, Nov. 28, 1999.

\* cited by examiner

SYSTEMS AND METHODS FOR CAPTURING COMMUNICATIONS DATA

TECHNICAL FIELD

The present disclosure is generally related to recording communications data.

BACKGROUND

Customer centers typically record communications between employees and between employees and customers to monitor quality of performance, among others. Some customer centers have recording components used for such recording that are specific to certain types of communications, such as time division multiplexing (TDM) and Internet Protocol (IP). For example, a customer center that records TDM audio has a TDM recorder. If that customer center records both TDM and IP communications data, the customer center also has an IP recorder that is separate and independent from a TDM recorder. In addition, if that customer center would like to record agent desktop screens, the customer center would need a screen capture recorder that is also separate and independent from the TDM and IP recorders. In addition, some customer centers have both TDM and IP infrastructures associated with recording communications at the customer centers. However, there are various communications protocols available that can be implemented in both the TDM and IP infrastructures. If the customer centers would like to change protocols, the customer centers may need different recording-related components associated with the changed protocol to implement the change, which may be expensive and time consuming.

SUMMARY

Systems and methods for capturing communications data are provided. An exemplary method comprises the steps of: establishing connection with a customer center, the customer center being associated with a communications infrastructure; obtaining information that is related to the communications infrastructure, the information obtained being related to a communications protocol that is associated with the communications infrastructure; determining the type of communications protocol based on the information obtained; determining whether the type of communications protocol is supported by a recording system; responsive to determining that the type of communications protocol is supported, receiving communications data using the determined communications protocol; determining whether to record the received communications data; and responsive to determining that the received communications data are to be recorded, recording the received communications data.

An exemplary recording system that captures communications data comprises an interface device that is operative to establish connection with a customer center via a communications infrastructure and a capture engine that communicates with the interface device. The capture engine has at least one interface library and is operative to receiving information related to the communications infrastructure, the information of which is related to a communications protocol that is associated with the communications infrastructure. The capture engine is further operative to determine the type of communications protocol based on the information obtained and determine whether the at least one interface library has a set of rules for the communications protocol, the set of rules of which is associated with at least one of the following: data representation, signaling, authentication and error detection, any of which is needed to send information over a communications channel. The capture engine is further operative to receive communications data using the communications protocol, determine whether to record the received communications data, and responsive to determining that the received communications data are to be recorded, record the communications data.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
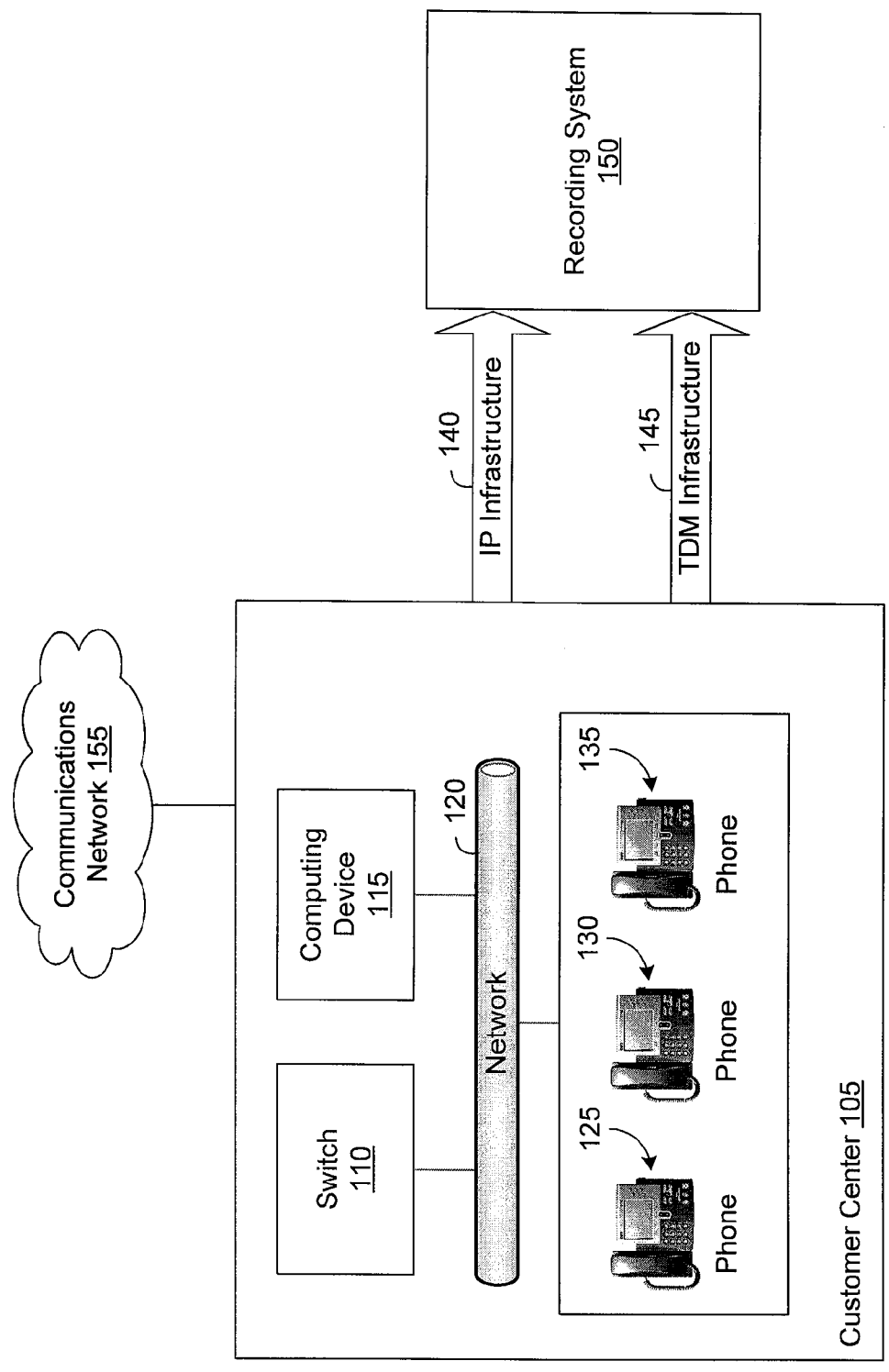
FIG. 1 is a schematic diagram of an embodiment of a system in which communications at a customer center can be recorded by a recording system.

Disclosed herein are systems and methods for capturing communications data at a customer center. In particular, embodiments of such a system incorporate a recording system that includes at least one interface library that facilitates receiving and recording of communications data. The recording system can be deployed at a centralized location, e.g., within a company premises, and/or embedded into a network as a service on the network and/or as intelligence in the network infrastructure.

It should be noted that a customer center can include, by way of example, but is not limited to, outsourced contact centers, outsourced customer relationship management, customer relationship management, voice of the customer, customer interaction, contact center, multi-media contact center, trading center, remote office, distributed enterprise, work-at-home agents, remote agents, branch office, back office, performance optimization, workforce optimization, hosted contact centers, and speech analytics, for example.

Additionally, included in this disclosure are embodiments of integrated workforce optimization platforms, as discussed in U.S. application Ser. No. 11/359,356, filed on Feb. 22, 2006, entitled "Systems and Methods for Workforce Optimization," which is hereby incorporated by reference in its entirety. At least one embodiment of an integrated workforce optimization platform integrates: (1) Quality Monitoring/Call Recording—voice of the customer; the complete customer experience across multimedia touch points; (2) Workforce Management—strategic forecasting and scheduling that drives efficiency and adherence, aids in planning, and helps facilitate optimum staffing and service levels; (3) Performance Management—key performance indicators (KPIs) and scorecards that analyze and help identify synergies, opportunities and improvement areas; (4) e-Learning—training, new information and protocol disseminated to staff, leveraging best practice customer interactions and delivering learning to support development; and/or (5) Analytics—deliver insights from customer interactions to drive business performance. By way of example, the integrated workforce optimization process and system can include planning and establishing goals—from both an enterprise and center perspective—to ensure alignment and objectives that complement and support one another. Such planning may be complemented with forecasting and scheduling of the workforce to ensure optimum service levels. Recording and measuring performance may also be utilized, leveraging quality monitoring/call recording to assess service quality and the customer experience.

Exemplary systems are first discussed with reference to the figures. Although these systems are described in detail, they are provided for purposes of illustration only and various modifications are feasible. After the exemplary systems are described, examples of flow diagrams of the systems are provided to explain the manner in which data can be recorded.

FIG. 1 is a schematic diagram of an embodiment of a system in which communications at a customer center can be recorded by a recording system. As indicated in this figure, the system 100 comprises a customer center premises 105 that includes a customer center switch 110, computing device 115, and phones 125, 130, 135, all of which are connected to a customer center network 120. The phones include, but are not limited to, turret phones, soft phones and Internet Protocol (IP) phones, among others.

Incoming communications from a communications network 155 can be routed to the switch 110, which can route the communications to the computing device 115 and/or phones 125, 130, 135. The communication network can be a Public Switch Telephony Network (PSTN) and/or IP-based network, among others. The incoming communications can include, but are not limited to, voice, text, and video communications, among others. The customer center network 120 can include, but is not limited to, a wide area network (WAN), a local area network (LAN), a virtual private network (VPN) and the Internet.

The switch 110 is operative to process the communications at the customer center 105 and transmit the communications to a recording system 150 via, for example, an IP infrastructure 140 and/or a TDM infrastructure 145, among others. The customer center 105 is further described in relation to FIG. 2. The switch 110 is further described in relation to FIG. 3.

The IP infrastructure 140 of the customer center 105 can include, but is not limited to, a Pseudowire Emulation Edge to Edge (PWE3) protocol, Session Initiation Protocol (SIP), and Real-Time Transport Protocol (RTP), among others. The objective of PWE3 protocol is to support many Layer 1 and Layer 2 services over a common packet switched network (PSN) infrastructure. The Layer 1 and Layer 2 services include, but are not limited to, frame relay, Ethernet, Asynchronous Transfer Mode (ATM), Synchronous Optical Network (SONET), and Time Division Multiplexing (TDM). The PWE3 protocol defines framework and architecture with particular requirements to satisfy the service-specific protocol that defines how each Layer 1 or Layer 2 is encapsulated in PSN frames. Examples of PSN include, but are not limited to, MultiProtocol Label Switching (MPLS), Internet Protocol (IP) such as RTP, IPv4, or IPv6, and Layer 2 Tunneling Protocol (L2TP). The PWE 3 protocol also defines control protocol to establish connectivity across the PSN.

TDM infrastructure includes a circuit mode communication with a fixed number of channels and constant bandwidth per channel. In circuit switched networks, such as the Public Switched Telephone Network (PSTN), among others, multiple subscribers' calls are transmitted along the same transmission medium. To accomplish this, network designers make use of TDM. TDM allows switches to create channels, also known as tributaries, within a transmission stream. A standard voice signal generally has a data bit rate of 64 kbit/s, determined using Nyquist's Sampling Criterion. TDM takes frames of the voice signals and multiplexes them into a TDM frame which runs at a higher bandwidth.

Figure 2:
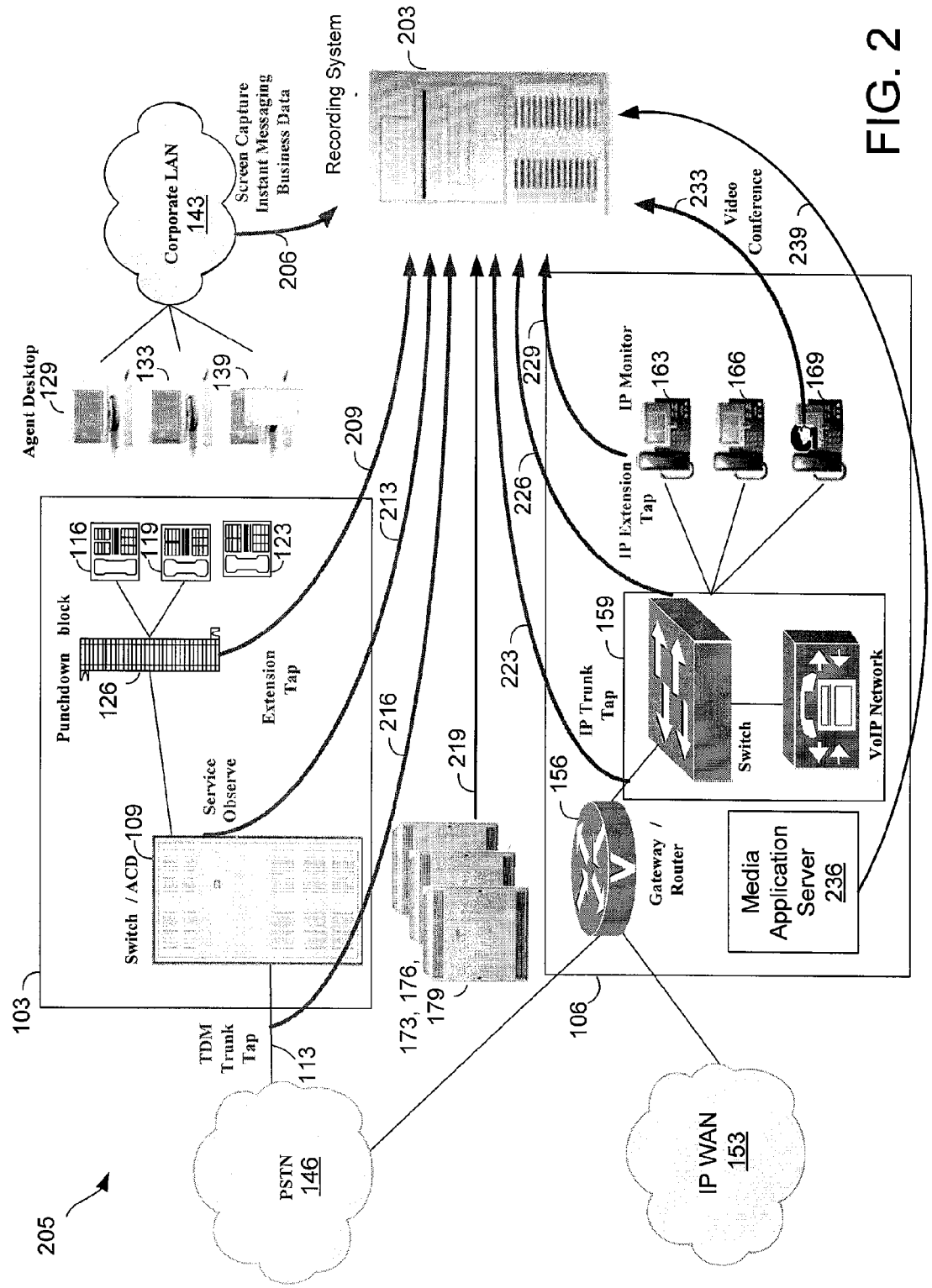
FIG. 2 is a schematic diagram of an embodiment of a communications network at a customer center, such as that shown in FIG. 1.

FIG. 2 is a schematic diagram of an embodiment of a communications network at a customer center 205. The customer center 205 includes a telephony system 103 and a voice over IP (VOIP) system 106. The telephony system 103 receives communications data by way of a switch 109 (or automatic call distributor "ACD") via line 113. The switch 109 can distribute incoming communications data to one or more telephones 116, 119, 123 via a punchdown block 126. The telephones may be coupled to desktops 129, 133, 139 that communicate with the telephones. In addition, the desktops 129, 133, 139 can be coupled to a corporate LAN 143, which enables the desktops to communicate with each other or other computers outside the customer center 205. The telephony system 103 is connected to a public switch telephone network (PSTN) 146 and can transmit outgoing communications data using the PSTN 146.

The Voice over Internet Protocol (VoIP) system 106 can be connected to the PSTN 146. The VoIP system 106 receives and transmits communications data via gateway/router 156. If the gateway 156 receives the communications data from the PSTN 146, the gateway 156 converts the communications data to digital communications data. Additionally or alternatively, the gateway 156 can receive digital communications data from an Internet Protocol Wide Area Network (IP WAN) 153. In either or both situations, the gateway 156 sends the digital communications data to a VoIP network/switch 159, which distributes the signal to VoIP phones 163, 166, 169.

A recording system 203 can be a single recording server or a cluster of recording servers, for example. The recording system 203 can receive various types of communication signals from the communication network and store the communication signals in an allocated resource (not shown). The recording system 203 can receive and store, for example, data 206 from the agent desktops 129, 133, 139, such as screen capture, instant message, and business data through the corporate LAN 143; audio data 209 from the punchdown block 126 by way of extension taps; service observation data 213 from the switch/ACD 109; communications data 216 between the switch 109 and PSTN 146 by way of TDM truck taps; IP data 223 between the gateway 156 and the VoIP Network/switch 159 by way of IP trunk taps; IP data 226 from the switch by way of IP extension taps; IP data 229 from IP phones 163, 166 by way of IP monitoring, media data 239 from the media application server 236, and video conference data 233 from the IP phone 169. Additionally or alternatively, the recording system 203 can receive and store communication signals in either 32-bit or 128-bit scheme, or both.

The recording system 203 can further receive various types of external contact center events 219 from the multiple servers 173, 176, 179. The recording system enables continued use of the multiple servers 173, 176, 179 by receiving the various types of external contact center events 219 and determines whether to record communications data based on the received events. Additionally or alternatively, the recording system 203 can receive and store data from media servers with recorder capabilities ("media server/recorder"). The recording system 203 includes interfaces that communicate with the media servers/recorder to manage the data stored in the media server/recorder, such as archive, data management, and search and mine. In other words, the recording system 203 can integrate with the media server/recorder as a cluster of subsystems. Additionally or alternatively, the recording system 203 receives and stores data stored in the media server/recorder.

Figure 3:
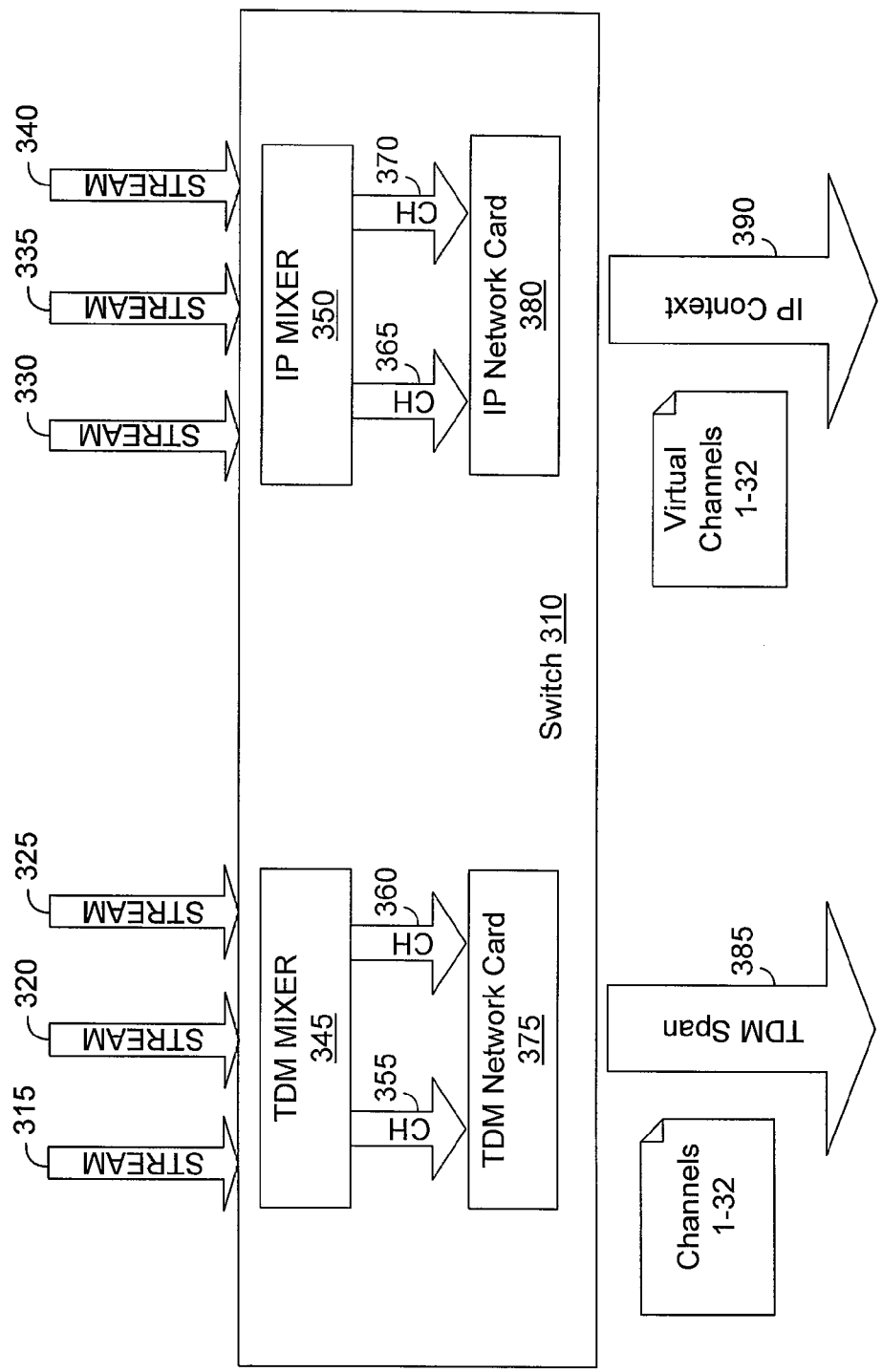
FIG. 3 is a block diagram of an embodiment of a switch, such as that shown in FIG. 1.

FIG. 3 is a block diagram of an embodiment of a switch 310, such as that shown in FIG. 1. The switch 310 includes a TDM mixer 345 and an IP mixer 350. The TDM mixer 345 is operative to receive TDM stream 315, TDM stream 320, and TDM stream 325 from TDM phones, among others. The TDM mixer 345 is further operative to mix the streams 315, 320, and 325 in various combinations. For example, stream 315 and stream 320 are mixed and transmitted on channel 355, and stream 325, which is not mixed with the other TDM streams, is processed and transmitted on channel 360. A TDM network card 375, e.g., Pulse Code Modulation 32 (PCM32) card, receives and processes the channels 355, 360, and transmits the channels 355, 360 on a TDM span 385 to a recording system. Each span can accommodate approximately 32 or more multiplex channels. A single TDM network card 375 may have one or more span.

The IP mixer 350 is operative to receive IP stream 330, IP stream 335, and IP stream 340, and mix the IP streams 330, 335, 340 in various combinations. In this example, the IP mixer 350 mixes the streams 335, 340 and transmits the mixed streams 335, 340 on channel 365, and the stream 330, which is not mixed with the other IP streams, is processed and transmitted on channel 370. The channels 365, 370 are transmitted to an IP network card 380, e.g., an Internet Protocol Switch Interface (IPSI) card, which transmits the channels on an IP context 390 to the recording system. Each context can have approximately 32 or more virtual channels. A single IP network card 380 may have one or more contexts. In general, the IPSI card is a hardware device on a Telephony Relay Service (TRS) backplane that communicates between the TRS system and IP-based phones and/or recorders. Alternatively or additionally, the IPSI card can be a dual-purpose IPSI card that communicates with both phones and recorders, or a special purpose version of the card that communicates only with recorders. The IPSI card can use PWE3 protocol or any other IP protocol to transmit voice to/from IP-based phones.

Figure 4:
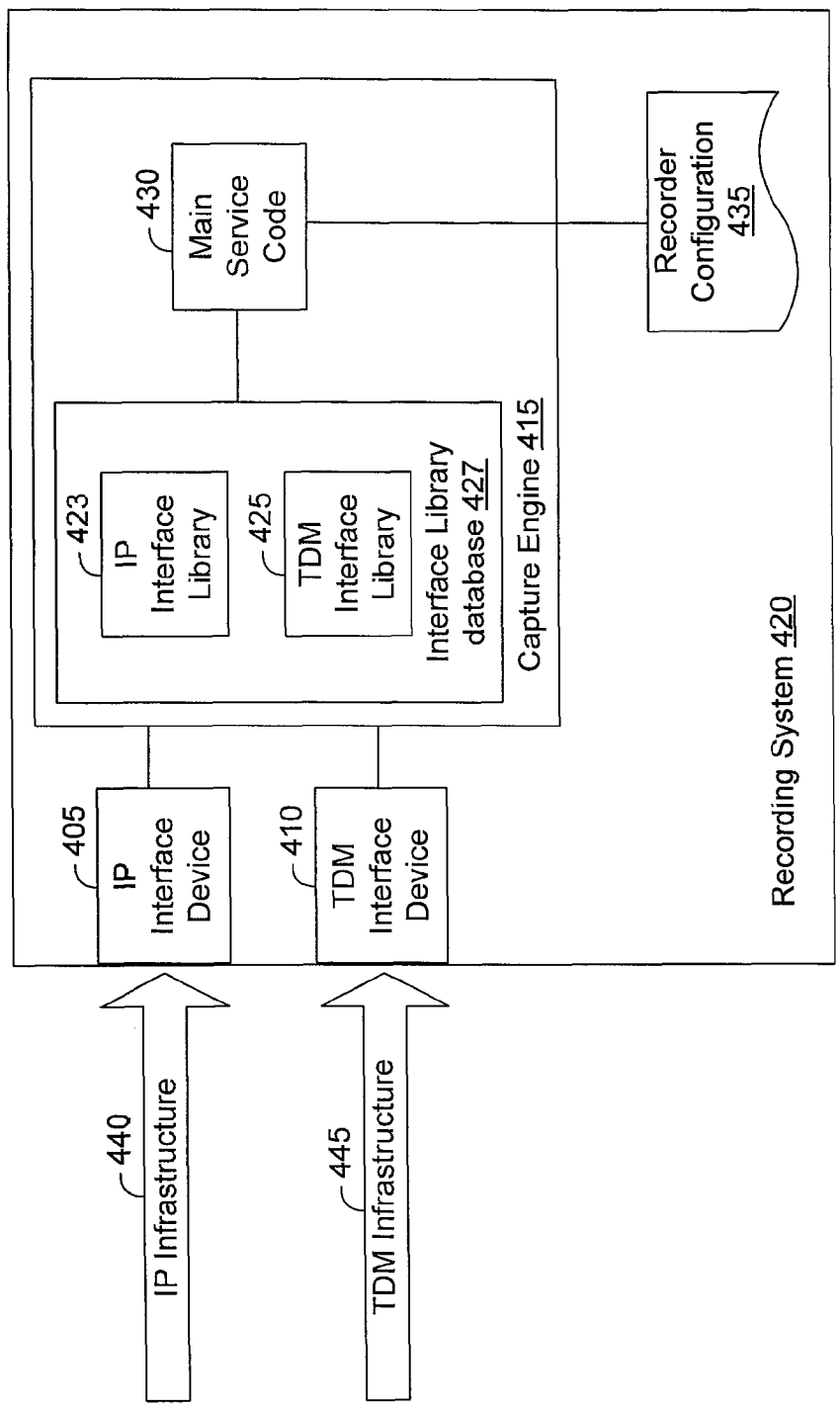
FIG. 4 is a block diagram of an embodiment of a recording system, such as that shown in FIG. 1.

FIG. 4 is a block diagram of an embodiment of a recording system 420, such as that shown in FIG. 1. IP infrastructure 440 and TDM infrastructure 445 establish connection between a customer center and the recording system 420. The recording system 420 abstracts information related to the IP and TDM infrastructures 440, 445 via an IP interface device 405, e.g., a Network Interface Card (NIC), and a TDM interface device 410, e.g., an Ai Logix™ PCM32 Card, of the recording system 420, respectively. That is, for example, the recording system 420 obtains information related to the IP infrastructure 440 and TDM infrastructure 445. Based on the information obtained, the recording system 420 determines a protocol and a network card that are being used by the customer center to communicate with the recording system 420.

The interface devices 405, 410 transmit the abstracted information to a capture engine 415 that provides the information to an interface library database 427. The interface library database 427 includes, but is not limited to, IP interface library 423 and TDM interface library 425, among others. The recording system 420 determines whether the protocols used in the IP and TDM infrastructures 440, 445 are supported by the recording system 420 based on the information abstracted. That is, the recording system 420 determines whether the protocols can be utilized to facilitate communication with the customer center. For example, the recording system 420 searches through the interface library database 427, and determines whether an interface library 423, 425 with a set of rules for the communications protocol exists in the interface library database 427. The set of rules is associated with data representation, signaling, authentication and error detection, that are generally needed to send information over a communications channel. Once the recording system 420 determines that interchanging data with the customer center over the communications channel can be achieved, the recording system 420 can receive and record the communications data from the customer center. In general, each library includes code developed to interface with a communications infrastructure.

At least one interface library can be stored in the database of the recording system such that the recording system 420 can search through the database to determine whether the interface library can facilitate interfacing a communications infrastructure of the customer center. Alternatively or additionally, an interface library can be developed and downloaded into the database to update the database. The database includes, but is not limited to, a text file, eXtensible Markup Language (XML) file, and Oracle™ or Structured Query Language (SQL) Server, among others.

Alternatively or additionally, each interface library 423, 425 can include, but is not limited to, at least one of a size buffer parameter and a callback period parameter. The size buffer parameter controls the size of the buffer used to hold communications data for each virtual channel. The size of the buffer can be larger than the callback period. The callback period parameter controls the frequency of callbacks. For example, each interface library 423, 425 can be configured with one callback per second for each channel. The size buffer parameter and callback period parameter facilitate initializing and shutting down the interface library 423, 425. The parameters are available for the interface library 423, 425 to setup and teardown any necessary resources for use. The interface library 423, 425 can be initialized and shutdown multiple times during the same process. Alternatively or additionally, the interface library 423, 425 can be initialized multiple times without interrupting any functionality.

Alternatively or additionally, each interface library 423, 425 can further include, but is not limited to, at least one of a context parameter and an adapter parameter. The context parameter identifies the contexts (PWE3 stream of several virtual channels) and facilitates streaming the contexts and reporting errors associated with the contexts. The adapter parameter identifies the network adapters that are used to connect to the network cards. The context parameter and adapter parameter facilitate causing the interface library 423, 425 to begin streaming data via the callback. If the connection associated with the streaming data is lost, the interface library 423, 425 signals warning and error callbacks to the main service code 430 indicating that the connection is lost. It should be noted that some forms of IP recording can use the adapter parameter to facilitate connection between the recorder and customer center.

The interface library 423, 425 can receive configuration information supplied by a main service code 430 from a recorder configuration 435. The interface library 423, 425 can further receive the external contact center events from a customer center. The interface library 423, 425 can signal the main service code 430 via a callback when the communications data are available to be received by the recording system 420, and signals the main service code 430 via the callback when the IP infrastructure 440 is disconnected from the recording system 420.

Some events include, but are not limited to: buffer ready, partial connection lost, all connection lost, and buffer overflow, among others. In general, the buffer ready event indicates that a buffer of the communications data is ready to be gathered and processed. The partial connection lost event indicates that one of the redundant connections is lost, but not all of them. The all connection lost event indicates that all of the redundant connections are lost. In both connection lost events, the recording system 420 can provide an alarm alerting a user that either a partial connection or all connections are lost. The buffer overflow event indicates that at least some communications data was lost because the recording system 420 was not able to gather the communications data before the buffer overflowed.

The main service code 430 loads configuration information from the recording system configuration 435 and configures the interface library 423, 425 with the configuration information. The main service code 430 further copies the communications data from the infrastructures 440, 445 into a buffer and processes the communications data, signals to standby recorders when the infrastructures 440, 445 are disconnected from the recording system 420, and communicates with the standby recorders of the recording system 420 to determine whether a standby recorder should take over recording the communication data from the disconnected recorder. In general, the main service code 430 includes capture engine codes that are loaded into the interface library 423, 425, which uses the capture engine code to facilitate obtaining the communications data to be recorded. The main service code 430 is further described in relation to FIG. 9.

Alternatively or additionally, the overall architecture of recording the TDM and IP communications data can be potentially similar except for the small differences of the interface libraries 423, 425. Therefore, the customer center and the recording system 420 can leverage the similarities and reduce overall development and costs. In addition, this similarity can facilitate either upgrade of customers from a TDM-based to an IP-based TRS system and allow for the combination of TDM and IP phones and switches at the customer center.

Figure 5:
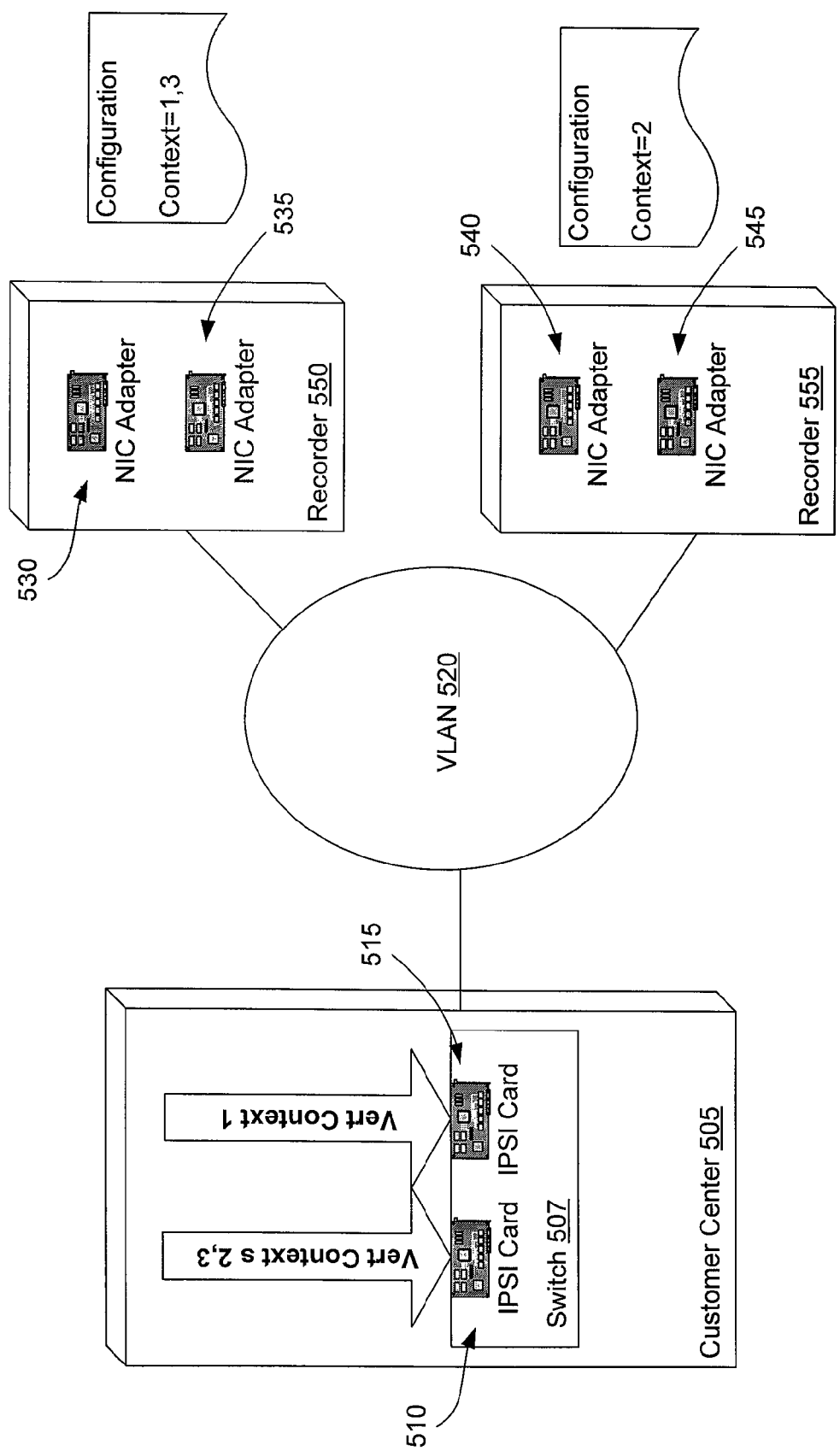
FIG. 5 is a block diagram of an embodiment of a customer center having Internet Protocol Switch Interface (IPSI) cards.

FIG. 5 is a block diagram of an embodiment of a customer center 505 having IPSI cards. The customer center 505 may have a switch 506 that includes one or more IPSI cards 510, 515. Such cards 510, 515 provide communications data to the recorders 550, 555 via a Virtual Local Area Network (VLAN) 520, respectively. Each recorder 550, 555 can communicate with the IPSI cards 510, 515 to record contexts 1, 2, 3.

Each recorder 550, 555 can be configured to be assigned at least one identification code associated with at least one context to be recorded. The recorder 550, 555 can identify and record its assigned context by using the identification code. For example, the recorder 550 can include NIC adapters 530, 535, which are configured to receive and facilitate recording contexts 1 and 3, respectively. The recorder 555 can include a NIC adapter 540, which is configured to receive and facilitate recording context 2. The recorder 555 further includes a NIC adapter 545, which communicates with other adapters 530, 535, 540 and determines whether any of the other adapters loses connection with the customer center 505. If the NIC adapter 545 determines that a connection is lost, the NIC adapter 545 takes over recording the communications data from the disconnected NIC adapter.

Alternatively or additionally, the customer center 505 can include an in-process interface (not shown) that is operative to change different protocols, such as, for example, from PWE3 protocol to an RTP protocol, without extensive development and high cost. For example, the communications data can be packaged in a G711 format, and instead of sending the G711 communications data using a PWE3 header, the customer center 505 replaces the PWE3 header with an RTP header using RTP compatible components. With this capability, the customer center 505 can control the changes to the IP interface without having to involve the recording system 150 to a significant degree.

Figure 6:
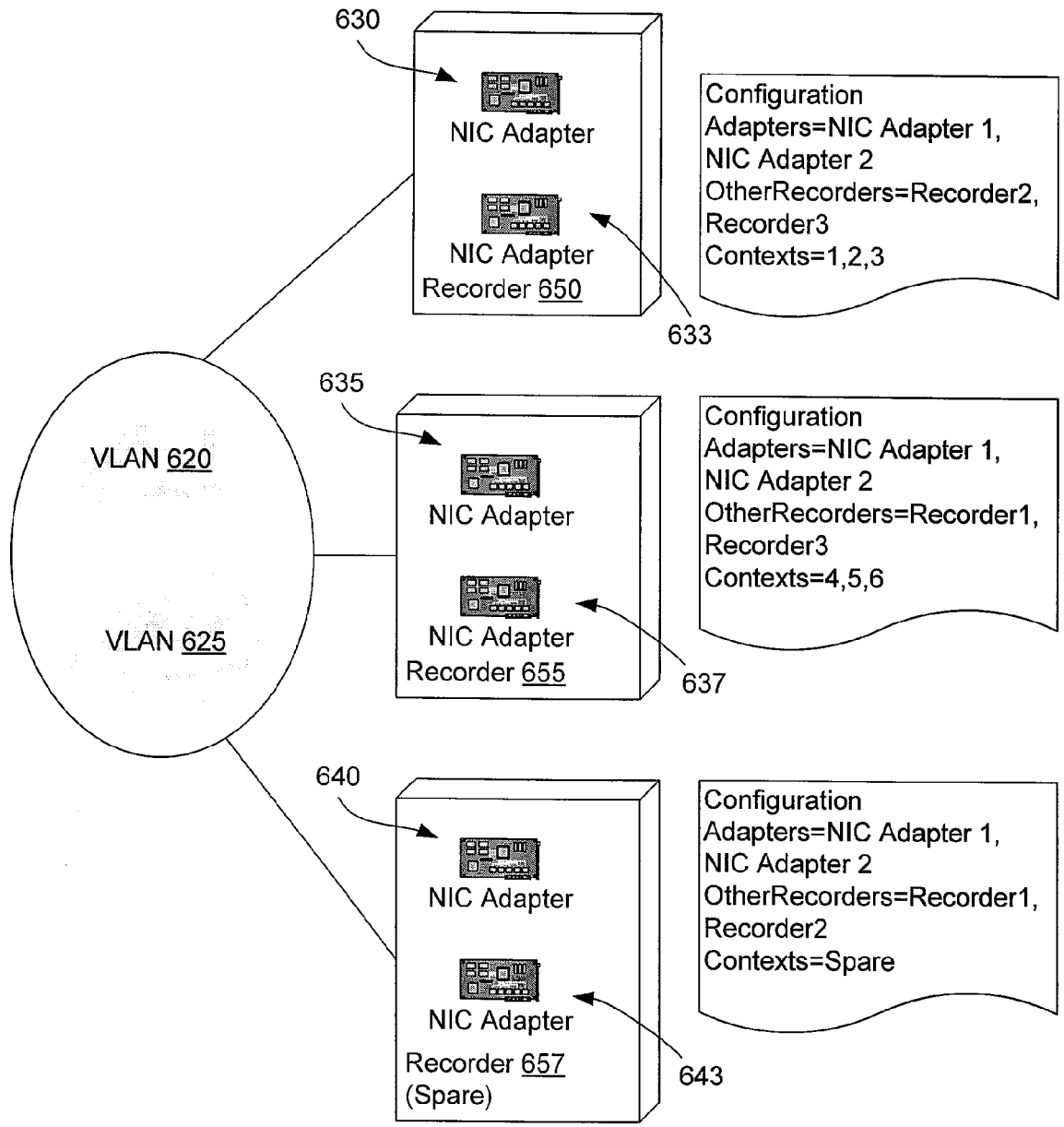
FIG. 6 is a block diagram of an embodiment of a recording system, such as that shown in FIG. 1, having a spare recorder.

FIG. 6 is a block diagram of an embodiment of a recording system, such as that shown in FIG. 1, having a spare recorder 657. In this embodiment, each recorder 650, 655, 657 includes NIC adapters 630, 633, 635, 637, 640, 643, respectively. The recording system detects when one of the recorders is no longer able to record. This can be achieved via a pinging mechanism between the recorders 650, 655, 657. Each recorder 650, 655, 657 includes a recorder identification, which facilitates the pinging mechanism between the recorders. The pinging can be achieved via VLANs 620, 625. The two or more VLANs 620, 625 can ensure that the spare recorder 657 does not falsely detect a loss of recording due to a problem with pinging and cause a switchover to occur even though all other recorders are functioning properly.

If a recorder loses its ability to record one or more contexts, the recorder can communicate with the spare recorder 657 via the pinging mechanism so that the spare recorder 657 can take over recording the one or more contexts. The spare recorder 657 can be configured to not acquire any contexts by default but only in the event that one recorder loses its ability to record its assigned context.

Figure 7:
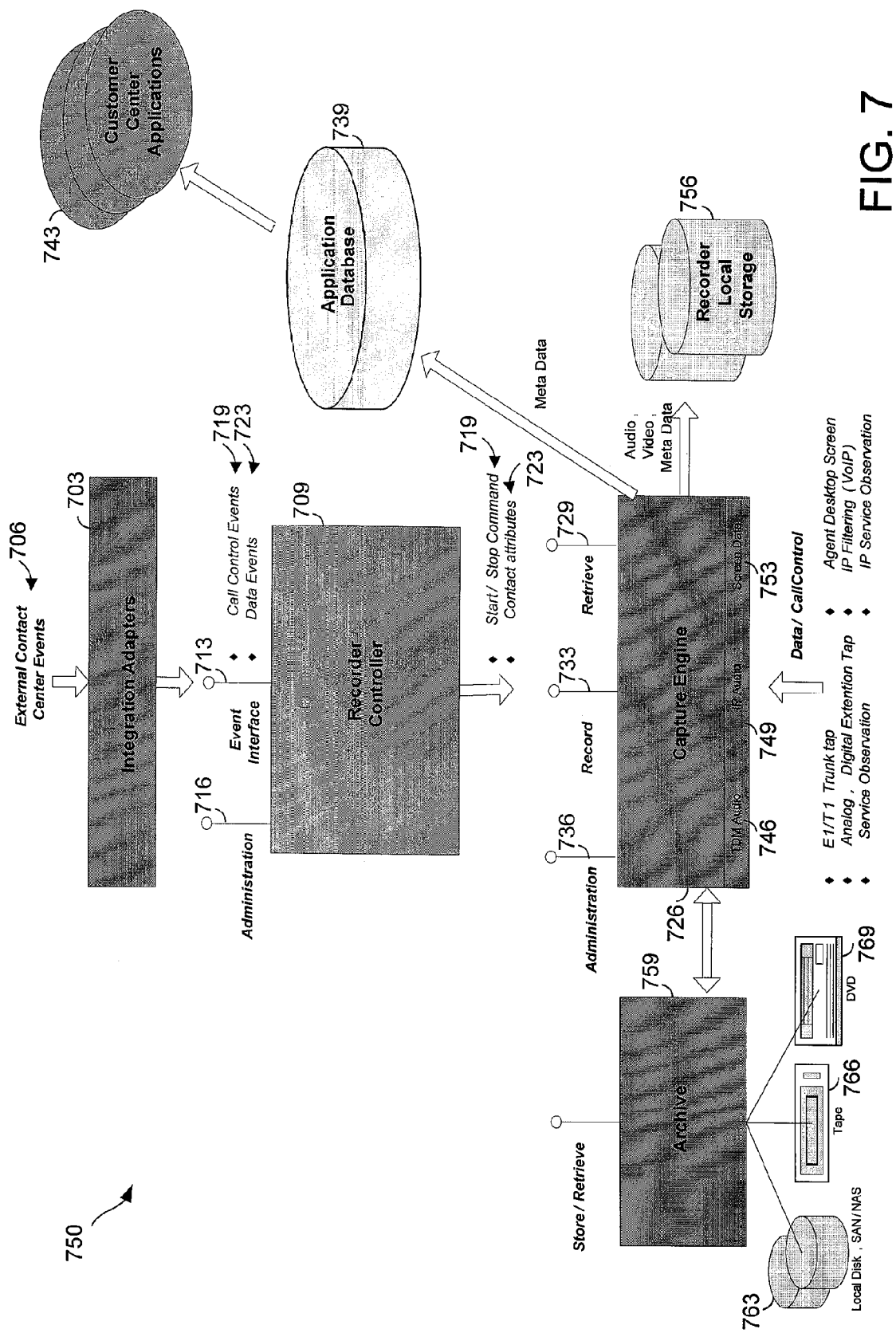
FIG. 7 is a block diagram of an embodiment of a recording system, such as that shown in FIG. 1.

FIG. 7 is a block diagram of an embodiment of a recording system, such as that shown in FIG. 1. The recording system 750 includes integration adapters 703 that communicate with a customer center. The integration adapters 703 receive external events (and/or custom attributes), such as call control events 719 and data events 723. The integration adapters 703 pass the external contact center events to a recorder controller 709, which determines whether to record communications data based on the external contact center events 706.

An event interface application 713 of the recording controller 709 receives the external contact center events. An administration application 716 of the recording controller 709 processes the external contact center events 706. After the processing is completed, the recorder controller 709 determines whether to record the communications data associated with the external contact center events 706. If the recorder controller 709 determines that the communications data is to be recorded, the recorder controller 709 transmits start/stop commands 719 and contact attributes 723 to a capture engine 726 or an archive 759. The recorder controller 709 can selectively record one (1) to one hundred (100) percent of the communications data. The recorder controller 709 can use business rule engines (not shown) to further selectively record audio/video, the business rule engines of which prioritize events above random recordings. The recorder controller 709 can record on demand, allocate optimum recording of a media channel, and monitor post-call activities.

Retrieve, record and administration applications 729, 733, 736 of the capture engine 726 receive and process the commands 719 and attributes 723 from the recorder controller 709. Specifically, the retrieve application 729 facilitates retrieving stored communications data (e.g., meta data) from the capture engine 726 and transmitting the stored communications data to an application enterprise datastore 739. Customer center applications 743 can access the information in the datastore 739 for analysis and optimization of the performance of the customer center.

The record application 733 instructs the capture engine 726 to start/stop recording the communications data that the capture engine 726 receives from various types of communication interfaces. The communication interfaces facilitate receiving and storing TDM audio 746, IP audio 749, screen data 753, IM chat (not shown), e-mail (not shown), video conference (not shown), and/or other multimedia data. The communication interfaces also facilitate tapping into the switches of the network (e.g., extension taps, TDM trunk taps, IP trunk taps, and IP extension taps) and communicating with a customer center to receive the communications data. The capture engine 726 can transmit audio, video, and meta data to a recorder local storage 756. The capture engine 726 can be a single platform with extendable interface types. The capture engine 726 includes, but is not limited to, as many as 736 concurrent channels and can be self-sufficient in a closed box with fault tolerance feature, minimum connection lost, and passive tap sense driven recording.

Additionally or alternatively, the recorder controller 709 can instruct the capture engine 726 to transmit the stored communications data to the archive 759. The recorder controller 709 can further instruct the archive 759 to store the communications data to a local disk 763, tape 766, and DVD 769. The recorder controller 709 can further instruct the archive 759 to retrieve the stored communications data from the local disk 763, tape 766, and DVD 769. The archive 759 can transmit the stored communications data to the capture engine 726, which transmits the communications data to a desirable location. The archive 759 can be a fault-tolerant storage of contact data and meta data. The archive 759 can manage multiple local storage media or integrate to a third party server. The archive 759 further supports the retrieval of contact data for playback applications.

Figure 8:
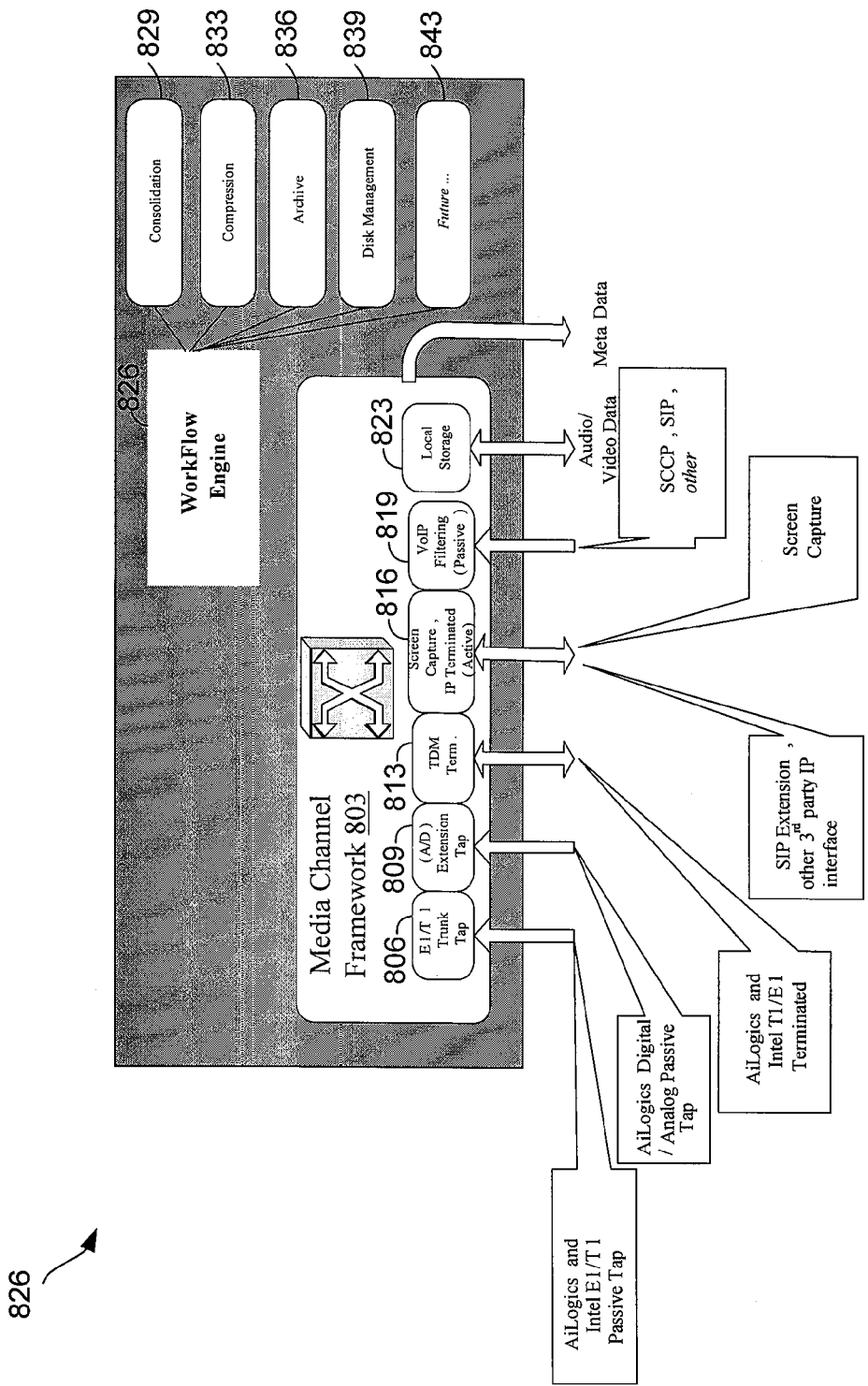
FIG. 8 is a block diagram of an embodiment of a capture engine, such as that shown in FIG. 4.

FIG. 8 is a block diagram of an embodiment of a capture engine, such as that shown in FIG. 4. The capture engine 826 facilitates receiving and recording various types of communications data into a recording system. In some embodiments, the capture engine 826 includes various types of communication interfaces that facilitate receiving and recording various types of communications data. For example, the capture engine 826 includes a media channel framework 803, which includes an E1/T1 trunk tap interface 806, A/D extension tap interface 809, TDM terminated interface 813, screen capture interface 816, voice over IP (VoIP) filter interface 819 and local storage interface 823. The E1/T1 trunk tap interface 806 can communicate with, for example, an Ai-Logix™ and Intel™ E1/T1 tap; the A/D extension tap interface 809 can communicate with, for example, an Ai-Logix™ digital/analog passive tap; and the TDM terminated interface 813 can communicate with, for example, an Ai-Logix™ and Intel E1/TI terminated. The screen capture interface 816 can communicate with software running on the agent's desktop; the IP Terminated interface can communicate with a Session Initiation Protocol (SIP) extension; the VoIP filtering interface 819 can decode with a Skinny Client Control Protocol (SCCP), SIP, or other similar protocol; and network cards (not shown) can receive 32-bit and 128-bit communications format.

The local storage interface 823 receives and stores audio/video data in a storage medium. The media channel framework 803 further outputs meta data to customer center applications 743 for optimization of customer centers or other applications that utilize the stored communications data. The capture engine 826 further includes a workflow engine 826 that can perform consolidation 829, compression 833, archive 836, disk management 839, and other processes 843 of stored data in the capture engine 826. The capture engine 826 is capable of content segment recording, which can support content level security at an application layer.

Alternative or additionally, a customer center may have a hybrid environment that includes communications devices operative to communicate data with a 32-bit or 128-bit packet header, the communications devices of which include, but are not limited to, 32-bit and 128-bit soft phones, gateways, routers, recording system, and switches, among others. In particular, the recording system includes the TDM terminated interface 813, IP terminated interface 816, and VoIP filtering 819 that can receive and record the communications data.

Figure 9:
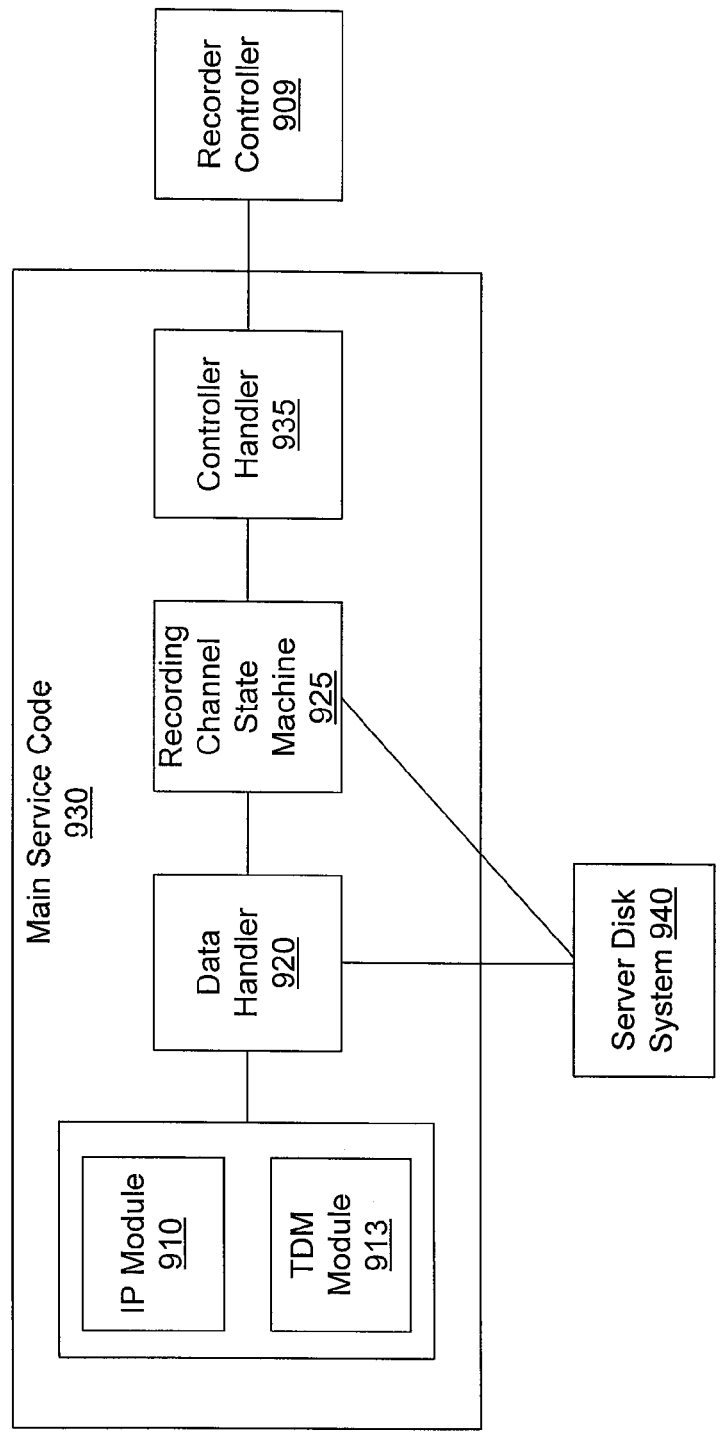
FIG. 9 is a block diagram of an embodiment of a main service code, such as that shown in FIG. 4.

FIG. 9 is a block diagram of an embodiment of a main service code 930, such as that shown in FIG. 4. The main service code 930 includes an IP module 910 and a TDM module 913. The modules 910, 913 decode communications data from TDM and IP interface devices, respectively, and pass the communications data to a data handler 920. The data handler 920 sends the communication data to a server disk system 940 as directed by a recording channel state machine 925. The data handler 920 passes tap-sense messages to the recording channel state machine 925. In general, tap-sense refers to call meta-data and begin/end call information obtained directly from the tapped line. For example, Vox audio files provide begin/end call information that is obtained by "listening" for noise on the line; Integrated Services Digital Network (ISDN) D-channel information provides begin/end call, calling and called party information; analog voltage provides begin/end call information; Dual-Tone Multi-Frequency (DTMF) tones provide dialed digits; Multi-Frequency (MF) tones provide caller identification; T1/E1 signalling bits provide begin/end call information; and Digital-station events provide begin/end call information and caller identification, among others.

The recording channel state machine 925 manages recording-idle state based on commands and tap-sense controls from a recorder controller 909, the management of which is generally performed at the beginning and the end of recordings. The recording channel state machine 925 controls tagging of meta data to the communications data.

The control commands from the recorder controller 909 are transmitted by a controller handler 935 to the recording channel state machine 925. The controller handler 935 can parse commands and maintain connections to the recorder controller 909. Such recorder controller 909 can direct the recording system based on external events, such as Computer Telephony Integration (CTI) events. The recorder controller 909 can send commands, such as start, stop, and tag, among others, to the control handler 935. The recording channel state machine 925 can transmit meta data to the server disk system 940.

Figure 10A:
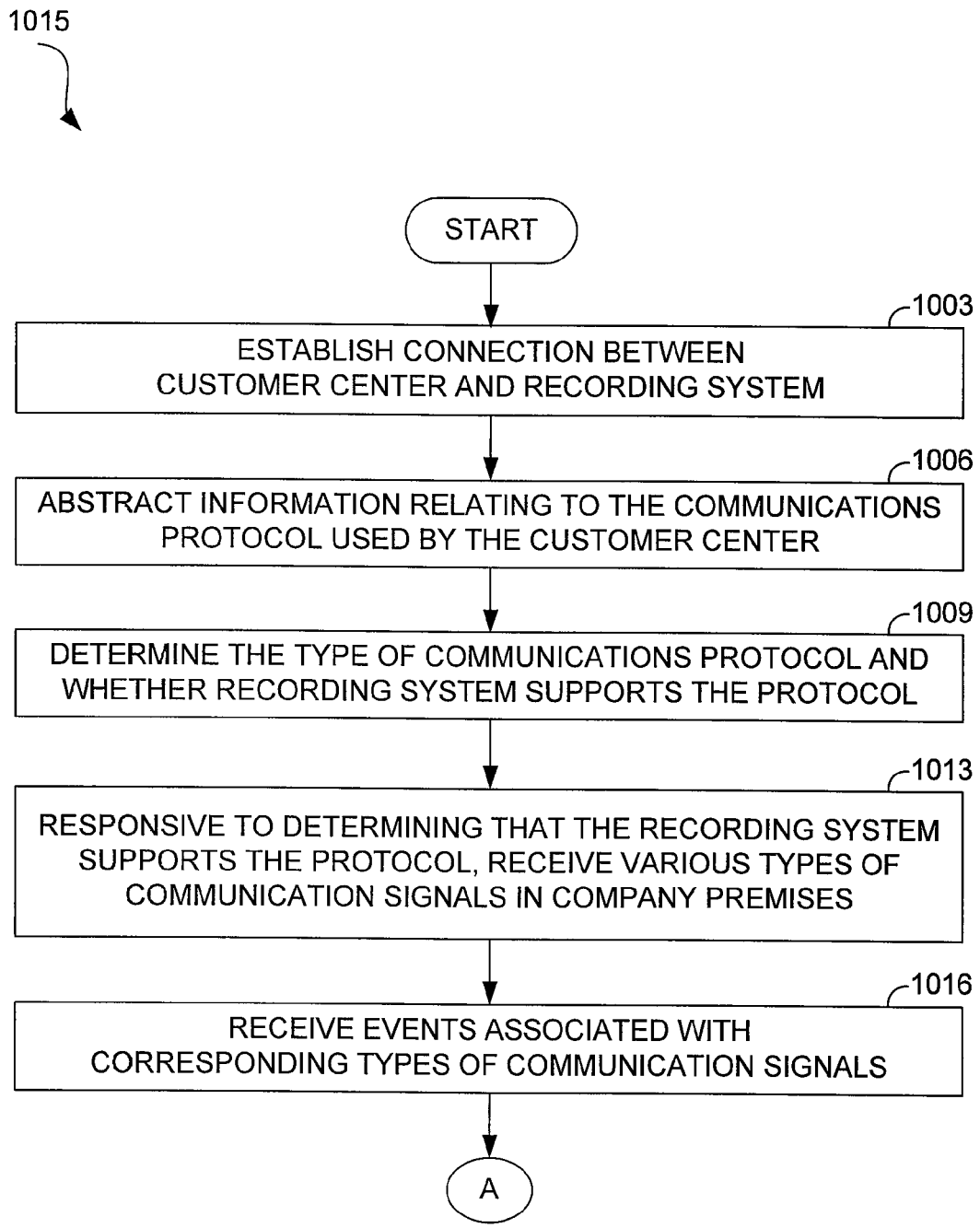
FIGS. 10A and 10B are flow diagrams that illustrate operation of an embodiment of a system, such as that shown in FIG. 1, that records communications data.
Figure 10B:
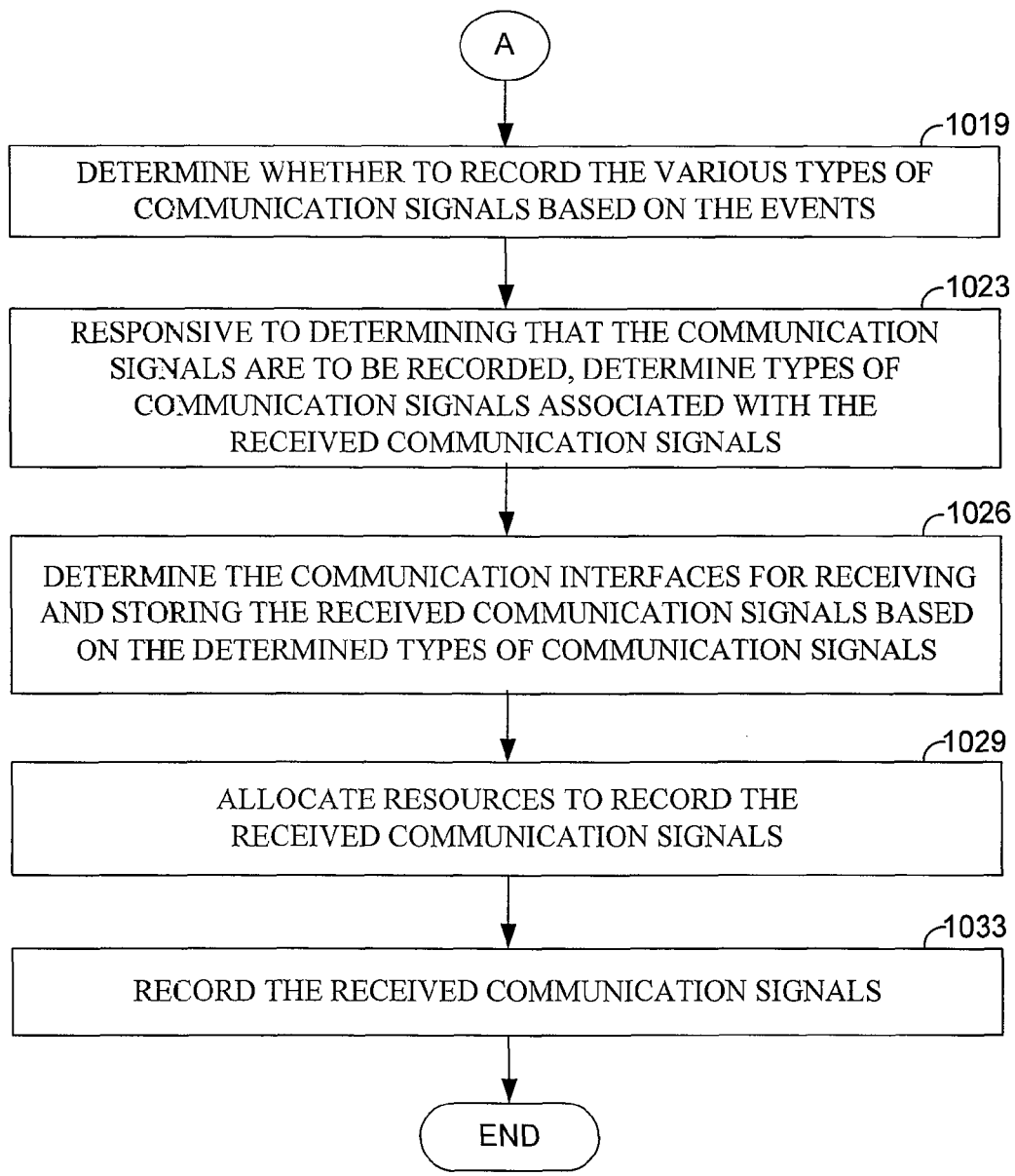

FIGS. 10A and 10B are flow diagrams that illustrate operation of an embodiment of a system that records communications data. Beginning with block 1003, connection is established between a customer center and a recording system via, for example, network cards and interface devices, among others. In block 1006, the recording system obtains information relating to the communications protocol used by the customer center, the communications protocol of which is associated with the customer center's communications infrastructure.

In block 1009, the recording system determines the type of communications protocol that is used by the customer center based on the obtained information. Responsive to determining the type of communication protocol, the recording system determines whether it supports the communication protocol. For example, the recording system includes various interface libraries that facilitate interfacing the recording system with the customer center and recording the communications data from the customer center. The various interface libraries can support TDM protocols and IP protocols. The recording system 420 can search through the various interface libraries and determines whether it 420 has an interface library with a set of rules for the communications protocol. The set of rules are associated with data representation, signaling, authentication and error detection, that are generally needed to send information over a communications channel.

In block 1013, responsive to determining that the recording system supports the determined type of communications protocol, the recording system receives various types of communications data at the customer center. As mentioned above, the recording system uses the various types of communication interfaces for receiving corresponding types of communications data. For example, the capture engine can use the E1/T1 trunk tap interface 406, extension tap interface 409 and TDM terminated interface 413 to record TDM communications data.

In block 1016, the recording system receives external contact center events associated with corresponding types of communications data at the customer center. In block 1019, the recording system determines whether to record the various types of communications data based on the events. In block 1023, responsive to determining that the communications data are to be recorded, the recording system determines the types of communications data associated with the received communications data. In block 1026, the recording system determines the communication interfaces for receiving and storing the received communications data based on the determined types of communications data. In block 1029, the recording system allocates resources to record the received communications data.

In block 1033, the recording system records the received communications data via the determined communication interfaces.

In some embodiments, various applications are able to access and analyze all the various types of communications data from the customer center in a recording system with one repository. This reduces steps that would otherwise be present if the various types of communications data are recorded in multiple recording systems. For example, if two types of communications data are recorded in the recording system instead of two servers, then applications that analyze the two types of the communications data can communicate, access, and search in one recording system instead of two recording systems.

It should be emphasized that the above-described embodiments are merely possible examples of implementations, merely set forth for a clear understanding of the principles of the disclosure. Many variations and modifications may be made to the above-described embodiments without departing substantially from the spirit and principles of the disclosure.

All such modifications and variations are intended to be included herein within the scope of this disclosure and protected by the following claims.

Therefore, having thus described the invention, at least the following is claimed:

1. A method for capturing communications data from a customer center coupled to a recording system, comprising the steps of:
    receiving information related to a communications protocol;
    determining whether the communications protocol is supported by the recording system;
    receiving communications data using the supported communications protocol;
    receiving external call contact events associated with the communications data; and
    recording the received communications data based on the received external call contact events, wherein determining whether the communications protocol is supported comprises searching through an interface library database having multiple interface libraries and determining whether there is a corresponding interface library with a set of rules for the determined communications protocol, the set of rules being associated with data representation, signaling, authentication and error detection, that are needed to send information over a communications channel; and wherein the method further comprising determining that the communications protocol is not supported, and downloading a corresponding interface library that has a set of rules for the communications protocol.

2. The method as defined in claim 1, further comprising:
    identifying the types of communications data associated with the received communications data; and
    responsive to identifying the types of communications data, determining multiple interfaces that facilitate recording the communications data.

3. The method as defined in claim 2, further comprising allocating resources to record the communications data.

4. The method as defined in claim 3, wherein the allocated resources are local storage databases.

5. The method as defined in claim 4, further comprising accessing the database of the recorded communications data.

6. The method as defined in claim 5, further comprising analyzing the accessed communications data stored in the database.

7. A system for capturing communications data, comprising:
    a communications infrastructure;
    a recording system being operative to establish connection with the customer center via the communications infrastructure, the recording system being operative to:
    obtain information related to the communications infrastructure, the information obtained being related to a communications protocol that is associated with the communications infrastructure;
    determine the type of communications protocol based on the information obtained;
    determine the type of communications protocol associated with the communications infrastructure;
    determine whether the type of communications protocol is supported by the recording system;
    responsive to determining that the type of communications protocol is supported, receive communications data using the determined communications protocol;
    receive external call contact events associated with the communications data;

determine whether to record the received communications data based on the external call contact events; and responsive to determining that the received communications data are to be recorded, record the communications data, wherein the recording system includes an interface library database having multiple interface libraries, the recording system being operative to search through the interface library database and determine a corresponding interface library with a set of rules for data representation, signaling, authentication and error detection, that are needed to send information over a communications channel; and wherein responsive to the recording system determining that the communications protocol is not supported, a corresponding interface library is uploaded into the recording system, the uploaded interface library having a set of rules for the communications protocol.

8. The system as defined in claim 7, wherein the least one interface library includes a Time Division Multiplexing (TDM) interface library and an Internet Protocol (IP) interface library that include sets of rules associated with TOM and IP infrastructures, respectively.

9. The system as defined in claim 8, wherein the IP interface library includes code associated with at least one of the following: Pseudowire Emulation Edge to Edge (PWE3) protocol, Session Initiation Protocol (SIP), and Real-Time Transport Protocol (RTP).

10. The system as defined in claim 7, wherein each interface library includes a size buffer parameter and a callback period parameter, the size buffer parameter being operative to control the size of the buffer used to hold communications data for each channel, the callback period parameter being operative to control the frequency of callbacks, the size buffer parameter and callback period parameter being operative to facilitate initializing and shutting down the interface library.

11. The system as defined in claim 10, wherein each interface library is operative to initialize and shutdown at least one time.

12. The system as defined in claim 10, wherein each interface library is operative to initialize multiple times without interrupting the operation of the recording system.

13. The system as defined in claim 7, wherein the recording system includes means for facilitating communications with the customer center.

14. The system as defined in claim 7, wherein the customer center includes a switch and a network card, both of which facilitate communications with the recording system.

15. The system as defined in claim 7, wherein the recording system comprises:

a recorder controller operative to determine whether to record communications data of various types and to transmit control signals that include instructions to record the communications data; and a capture engine operative to receive the control signals and to receive the communications data, wherein the capture engine includes multiple interfaces operative to facilitate receiving and recording the communications data, wherein the capture engine is further operative to: determine whether to record the received communications data based on the control signals, responsive to determining that the received communications data are to be recorded, determine types of communications data associated with the received communications data, responsive to determining the types of communications data, determine the multiple interfaces that facilitate recording the communications data, and record the communications data via the corresponding multiple interfaces.

16. The system as defined in claim 15, further comprising an archive system operative to store the communications data.

17. The system as defined in claim 16, wherein the archive system stores the recorded communications data in a database.

18. The system as defined in claim 17, wherein the multiple interfaces include one of the following: trunk tap, extension tap, TDM terminated, IP terminated, and VoIP filtering interfaces.

19. A recording system that captures communications data, comprising:

an interface device that is operative to establish a connection with a customer center via a communications infrastructure; and a capture engine that communicates with the interface device, the capture engine having at least one interface library, the capture engine being operative to:

receive information related to the communications infrastructure, the received information being related to a communications protocol that is associated with the communications infrastructure determine the type of communications protocol based on the information obtained;

receive external call contact events associated with the communications data;

determine whether the at least one interface library has a set of rules for the communications protocol, the set of rules being associated with at least one of the following: data representation, signaling, authentication and error detection, any of which is needed to send information over a communications channel, receive communications data using the communications protocol, determine whether to record the received communications data, and responsive to determining that the received communications data are to be recorded based on the external call contact events, record the communications data; and wherein responsive to the capture engine determining that the communications protocol is not supported, a corresponding interface library is uploaded into the capture engine, the uploaded interface library having a set of rules for the communications protocol.

20. The recording system as defined in claim 19, wherein the capture engine includes an interface library database having multiple interface libraries, the capture engine being operative to search through the interface library database and determine a corresponding interface library with a set of rules for the communications protocol.

21. The recording system as defined in claim 19, wherein the least one interface library includes a Time Division Multiplexing (TDM) interface library and an Internet Protocol (IP) interface library that include code associated with TDM and IP infrastructures, respectively.

22. The recording system as defined in claim 21, wherein the IP interface library includes code associated with at least one of the following: Pseudowire Emulation Edge to Edge (PWE3) protocol, Session Initiation Protocol (SIP), and Real-Time Transport Protocol (RTP).

23. The recording system as defined in claim 19, wherein each interface library includes a size buffer parameter and a callback period parameter, the size buffer parameter being operative to control the size of the buffer used to hold communications data for each channel, the callback period parameter being operative to control the frequency of callbacks, the size buffer parameter and callback period parameter being operative to facilitate initializing and shutting down the interface library.

24. The recording system as defined in claim 19, wherein each interface library is operative to initialize and shutdown at least one time.

25. The system as defined in claim 19, wherein each interface library is operative to initialize multiple times without interrupting the operation of the recording system.

* * * * *